June 20, 1950 A. C. ARBOGAST 2,512,294
JOINT STRUCTURE FOR THIN-WALLED TUBING
Filed Dec. 8, 1947
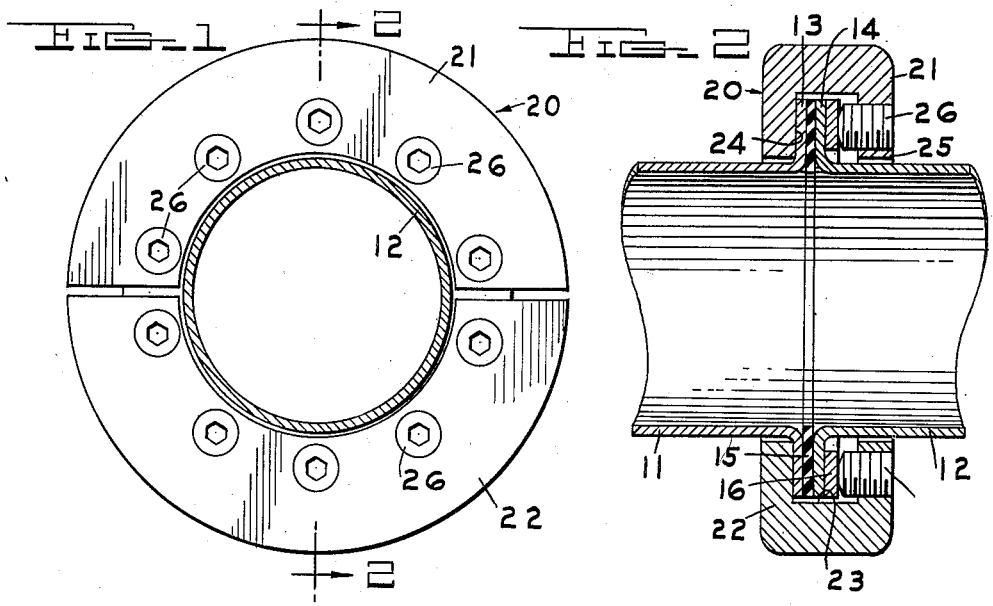
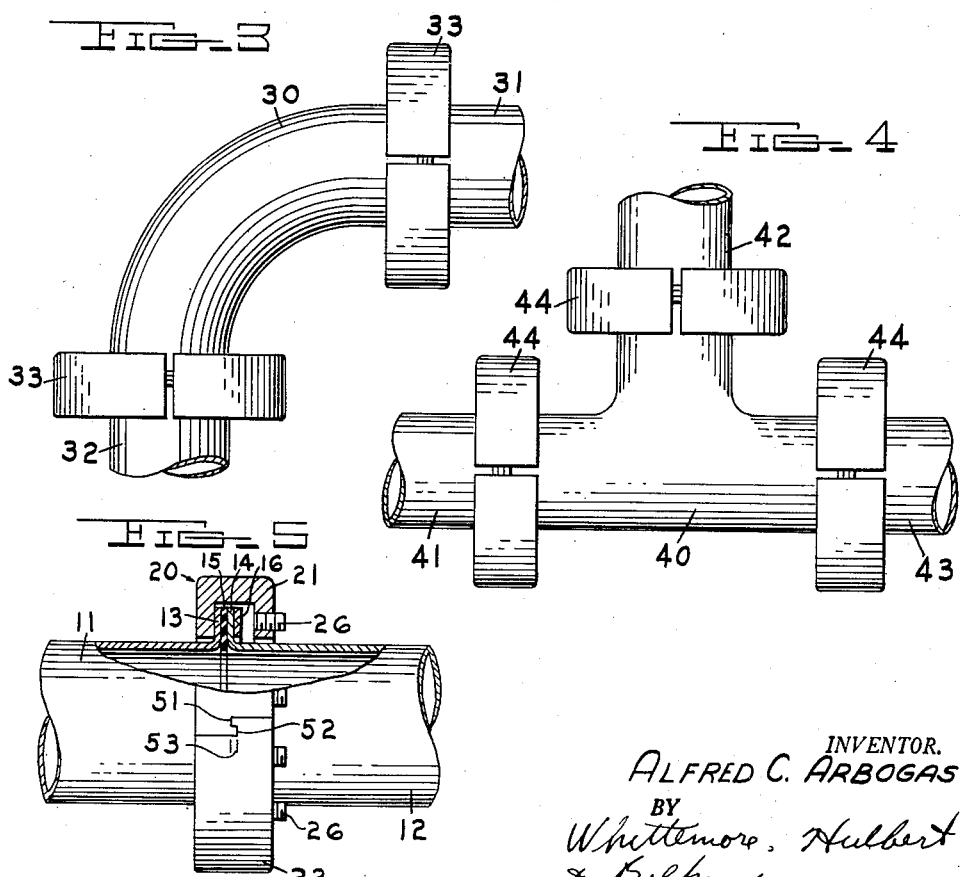
INVENTOR.
ALFRED C. ARBOGAST
BY
Whittemore, Hulbert
& Belknap ATTORNEYS Patented June 20, 1950

2,512,294

UNITED STATES PATENT OFFICE 2,512,294

JOINT STRUCTURE FOR THIN-WALLED TUBING

Alfred C. Arbogast, Elkhart, Ind., assignor to Northern Indiana Brass Company, Elkhart, Ind., a corporation of Indiana Application December 8, 1947, Serial No. 790,287

10 Claims. (Cl. 285—129)

The present invention relates to joint structure for thin-walled tubing.

While there exists methods of effecting joints between sections of thin-walled tubing which are entirely satisfactory in use, these methods for the most part require skill in welding, brazing or soldering technique and further result in the production of joints which are not ordinarily separable after completion. There is at the present time a demand for joints which may be effected by unskilled personnel and particularly joints of this type which may be disassembled and reassembled.

The present invention relates to a joint of this type, and described in general terms it comprises the provision of an internally grooved or channeled collar formed of a plurality of sections. The sections of thin-walled tubing are provided with radially extending flanges at their ends. The joint includes an annular sealing gasket intermediate adjacent tube flanges and a rigid pressure ring assembled with the flanges and gasket in contact with the outer surface of one of the flanges. The joint is completed by assembling the collar sections over the flanges, gasket and pressure ring and thereafter tightening pressure elements located between one wall of the groove or channel and the pressure ring. These pressure elements may conveniently be in the form of screws threaded into suitable openings formed into a channeled wall of the collar. Due to the rigidity of the pressure ring clamping pressure is applied substantially uniformly around the periphery of the tube flanges. In addition the assembly of the collar sections over the flanges, gasket and pressure ring results in automatically bringing these parts into concentricity.

With the foregoing general description in mind, it is an object of the present invention to provide an improved and simplified tube joint for thin-walled tubing.

More specifically, it is an object of the present invention to provide a tube joint for ends of thin-walled tubing by means of which a fluid-tight joint may be quickly and easily produced by unskilled personnel and in which the joint is susceptible of subsequent disassembly and reassembly.

It is a further object of the present invention to provide a tube joint for the flanged ends of thin-walled tubing which comprises an assembly collar formed in separable sections and an annular sealing gasket to be positioned between adjacent tube flanges, the collar sections being designed to bring the tube flanges and gasket into concentricity upon assembly.

Other objects and features of the invention will become apparent as the description proceeds, especially when taken in conjunction with the accompanying drawings, wherein:

Figure 1 is a transverse section adjacent a tube joint embodying the present invention;

Figure 2 is a section on the line 2—2, Figure 1;

Figure 3 is a side elevation of an elbow construction embodying the present invention;

Figure 4 is a side elevation of a T construction embodying the present invention; and Figure 5 is a side elevation, partly in section, of a somewhat different embodiment of the present invention.

Referring now to Figures 1 and 2, there is illustrated a tube joint for sections of thin-walled tubing 11 and 12, which sections are provided at their ends with radially extending flanges 13 and 14 respectively. Intermediate the flanges is an annular sealing gasket 15 of suitable material, the internal diameter of the sealing gasket preferably being substantially the same as that of the tube sections 11 and 12, and its outside diameter being substantially the same as the outside diameter of the tube flanges 13 and 14. Adjacent one of the flanges 13 or 14 is a rigid pressure ring 16, the outside diameter of which is substantially equal to the outside diameter of the tube flanges 13 and 14 and the sealing gasket 15.

An assembly collar indicated generally at 20 is provided, this collar being formed of substantially semi-annular elements 21 and 22. Sections 21 and 22 are provided with internal grooves or channels 23. The channels 23 have an internal diameter just slightly larger than the external diameter of the tube flanges 13 and 14, the gasket 15 and the pressure ring 16. In addition, the channel 23 is provided with at least one flat side wall 24 adapted to have full surface-to-surface contact throughout their overlapping extent with the outer surface of one of the tube flanges, as for example the flange 13 shown in Figure 2. The width of the groove or channel 23 is substantially larger than the combined thickness of the two tube flanges 13 and 14, the gasket 15 and the pressure ring 16. The side walls 25 of the channel of the collar sections 21 and 22 are provided with tapped openings in which are threaded clamping screws 26 which are adapted to extend between the wall 25 and the clamping ring 16 so as to apply pressure thereto at a plurality of relatively closely spaced points.

Due to the fact that the internal diameter of the groove or channel 23 is very slightly larger than the outside diameter of the tube flanges, gasket and pressure ring, it will be apparent that with the gasket interposed between adjacent tube flanges and with the pressure ring brought into position adjacent the tube flanges and gasket, the simple act of assembling the collar sections brings all of the parts into substantially exact concentricity and thereafter the joint is completed simply by tightening down the clamping screws 26. Due to the rigidity of the pressure ring 16, the pressure applied to a plurality of points by the clamping screws 26 is transmitted substantially uniformly around the flanges 13 and 14 and accordingly substantially uniform pressure is applied to the gasket 15. In the event that the tube section carrying the pressure ring 16 is provided with flanges at both ends, it will be apparent that the pressure ring must be assembled with the tubing prior to the formation of the flanges.

In Figures 1 and 2 there is illustrated a simple joint, as for example between the ends of straight sections of tubing. In Figure 3 there is illustrated an elbow element 30 connected to straight sections 31 and 32 by couplings 33 which may be identical with the coupling illustrated in Figures 1 and 2. In Figure 4 there is illustrated a T 40 connected to tube sections 41, 42 and 43 by couplings 44 which may be identical with the coupling illustrated in Figures 1 and 2.

The collar elements 21 and 22 may be formed from steel, cast iron, bronze, manganese, or any material which is sufficiently strong to withstand the pressure exerted by the clamping elements 26 and the dimensions of the collar sections are such as to render them substantially rigid in use.

Figure 2 illustrates tube sections having integrally formed flanges at their ends, but it will be apparent that the invention may be practiced with tube sections provided with flanged ferrules welded or otherwise permanently secured at the ends of lengths of tubing.

In a practical embodiment of the present invention the inside diameter of the collar groove or channel was made approximately 1/64 of an inch larger in diameter than the outside diameter of the tube flanges and the gasket. The important feature is that this tolerance is maintained sufficiently close so that the flanges and gasket are automatically centered when the sections of the collar are put in place.

The embodiment illustrated in Figure 5 is similar to the embodiment previously described but differs in that means have been provided for effecting a positive interlock between the semiannular members 21 and 22 which together comprise the collar 20. In this case the members 21 and 22 are provided with interfitting ears 51 and 52 respectively. The amount of overlap of the ears indicated at 53 is somewhat less than the space between the pressure ring 16 and the flanges of the semi-annular members 21 and 22. Accordingly, the semi-annular members may be placed over the flanges 13 and 14, the gasket 15 and the pressure ring 16. Thereafter the parts are relatively moved to cause the ears 51 and 52 to interfit as illustrated in Figure 5. It will be understood that similar ears 51 and 52 are provided at both ends of the semi-annular members.

The provision of the clamping ring not only insures an even distribution of pressure around the flanges and gasket but also protects the flanges from being marred by the set screws. This results in the possibility of repeated assembly and disassembly of the joint, which results in a great economy.

It will be observed that the clamping screws 26 are located very closely adjacent to the periphery of the tube sections, thereby applying great pressure at the exact position where pressures are required in order to seal the joint.

One of the important advantages of the present construction over prior bolted, flanged joints of commercial type is the absence of crevices underneath bolts, etc., where foreign matter might accumulate, thereby causing an unsanitary condition. The present joint provides a completely sealed protected joint.

The installation of these joints with tubing is substantially foolproof and the joints are accessible because the recessed head set screws can be used in close quarters.

The diameter of the collar is only slightly larger than the flanges on the pipe, thereby permitting this joint to be used in inaccessible places where ordinary flanged fittings would fail to fit.

This joint has been subjected to pressure tests and has been proved to withstand very high pressures. This is attributable largely to the fact that the pressure screws 26 are so placed on the diameter of the pressure ring that a complete bearing on all surfaces of the flanges is provided.

It will be apparent that these fittings can be taken down very quickly for gasket inspection or for cleaning and immediately reassembled with assurance that there is a complete concentricity of the flanges, gasket and sealing ring.

Another important advantage of the present type of joint is that the necessity of welding is completely avoided. It has been found that in thin-walled, corrosion-resisting tubing, the corrosion-resisting powers of the alloys employed are many times lost because of carbon segregation. In the present type of joint where corrosion-resisting alloys are employed the fittings may be fabricated in a factory with proper heat treatment so that the completed fittings will have their full intended corrosion resistance. Furthermore, in many installations where thin-walled tubing is most desirable, welding, soldering or brazing would involve hazards due to various reasons, such for example as the presence of explosive vapors or the like.

The drawings and the foregoing specification constitute a description of the improved joint structure for thin-walled tubing in such full, clear, concise and exact terms as to enable any person skilled in the art to practice the invention, the scope of which is indicated by the appended claims.

What I claim as my invention is:

1. Separable coupling structure for thin-walled radially flanged tubing comprising a pair of unitary semi-annular collars having semi-annular cylindrically shaped recesses at the inner side of said collars providing spaced, radially inwardly extending flanges at opposite sides of said recesses, the internal diameter of said recesses being just slightly larger than the outside diameter of the flanges on the tubing, an annular gasket in surface-to-surface contact with the flanges of said tubing between said flanges, a flat annular metal pressure ring in said recess of an outside diameter just slightly smaller than the inside diameter of said recess, and a plurality of assembly screws threaded in openings provided in one of the flanges of said collars and engaging said pressure ring to retain the parts assembled to form a fluid-tight joint.

2. Separable coupling structure for thin-walled flanged tubing comprising a pair of unitary semi-annular collars of internally open, substantially U-shaped cross section providing flat radially extending flanges assembled over the flanges of said tubing, a gasket between the flanges of said tubing, a flat pressure ring in said collars, and clamping means extending through a flange of each of said collars and engaging said pressure ring.

3. Separable coupling structure for thin-walled flanged tubing comprising a pair of unitary semi-annular collars of internally open, substantially U-shaped cross section providing flat radially extending flanges assembled over the flanges of said tubing, a gasket between the flanges of said tubing, a flat pressure ring in said collars, and clamping means extending through said collars and engaging said pressure ring, said clamping means comprising screws threaded into openings provided in one flange of the collars.

4. Separable coupling structure for thin-walled flanged tubing comprising a pair of unitary semi-annular collars of internally open, substantially U-shaped cross section providing flat radially extending flanges assembled over the flanges of said tubing, a gasket between the flanges of said tubing, a flat pressure ring in said collars, said collars and pressure ring being rigid whereby substantially uniform sealing pressure is applied to the flanges of the tubing and the gasket material therebetween, and clamping means extending through a flange of each of said collars and engaging said pressure ring.

5. Separable coupling structure for thin-walled flanged tubing comprising an annular collar having flat, radially extending flanges defining an internal annular flange-receiving groove of an internal diameter just slightly larger than the outside diameter of the flanges on the tubing and of a width substantially greater than the thickness of a pair of tubing flanges, said collar being formed of a plurality of unitary arcuate sections none of which is larger than 180° of arc, and annular gasket received between adjacent tube flanges in said groove, a flat rigid pressure ring in engagement with an outer surface of one of said tube flanges in said groove, the outer diameter of said gasket and ring being just slightly smaller than the internal diameter of said groove so that assembly of said sections over said tube flanges, gasket and ring aligns said parts in concentric relation, and clamping elements extending between one flange of said collar and said ring to press the assembly of said flanges, gasket and ring against the opposite flange of said groove to establish a fluid-tight tube connection.

6. A connection comprising a pair of thin-walled hollow elements having tubular portions provided at their ends with radially extending flanges, said tubular portions and flanges being of identical size, a pair of unitary semi-annular collars of internally open, substantially U-shaped cross section having flat radially extending flanges assembled over said tube flanges, a gasket between the flanges of said tubing, a flat pressure ring in said collars, and clamping means extending through the flanges of each of said collars and engaging said pressure ring.

7. Separable coupling structure for thin-walled flanged tubing comprising an annular collar having an internal annular flange-receiving groove of an internal diameter just slightly larged than the outside diameter of the flanges on the tubing and of a width substantially greater than the thickness of a pair of tubing flanges, said collar being formed of a plurality of unitary arcuate sections none of which is larger than 180° of arc, an annular gasket received between adjacent tube flanges in said groove, a rigid pressure ring in engagement with an outer surface of one of said tube flanges in said groove, the outer diameter of said gasket and ring being just slightly smaller than the internal diameter of said groove so that assembly of said sections over said flanges, gasket and ring aligns said parts in concentric relation, and clamping elements extending between one wall of said groove and said ring to press the assembly of said flanges, gasket and ring against the opposite wall of said groove to establish a fluid-tight tube connection, the ends of said sections having interfitting elements engageable in assembly and retained in engagement by said clamping elements effective to prevent radial separation of said sections.

8. A rigid connection comprising a pair of thin-walled tubular elements having outwardly extending radial flanges at their adjacent ends, an annular sealing gasket interposed between said flanges, a pair of unitary, rigid semi-annular collars assembled over said flanges, said collars each being of internally open, substantially U-shaped cross-section and presenting opposed pairs of inwardly extending flat radial flanges confronting the flanges of said elements, a flat rigid pressure ring in said assembled collars abutting the outer surface of one of the flanges of said tubular elements, and clamping means extending through the flanges at one side of said collars at circumferentially spaced points and engaging the pressure ring to apply clamping pressure uniformly to the flanges of said elements and to press said last mentioned flanges against the opposite flanges of said collars.

9. A rigid connection comprising a pair of thin-walled tubular elements having outwardly extending radial flanges at their adjacent ends, an annular sealing gasket interposed between said flanges, a pair of unitary, rigid semi-annular collars assembled over said flanges, said collars each being of internally open, substantially U-shaped cross-section and presenting opposed pairs of inwardly extending flat radial flanges confronting the flanges of said elements, a flat rigid pressure ring in said assembled collars abutting the outer surface of one of the flanges of said tubular elements, and clamping means extending through the flanges at one side of said collars at circumferentially spaced points and engaging the pressure ring to apply clamping pressure uniformly to the flanges of said elements and to press said last mentioned flanges against the opposite flanges of said collars, the ends of said collars having interfitting abutment portions preventing radial separation of said collars while in aligned relation.

10. A rigid connection comprising a pair of thin-walled tubular elements having outwardly extending radial flanges at their adjacent ends, an annular sealing gasket interposed between said flanges, a pair of unitary, rigid semi-annular collars assembled over said flanges, said collars each being of internally open, substantially U-shaped cross-section and presenting opposed pairs of inwardly extending flat radial flanges confronting the flanges of said elements, a flat rigid pressure ring in said assembled collars abutting the outer surface of one of the flanges of said tubular elements, and clamping means extending through the flanges at one side of said collars at circumferentially spaced points and engaging the pressure ring to apply clamping pressure uniformly to the flanges of said elements and to press said last mentioned flanges against the opposite flanges of said collars, the space between the flanges of said collars being substantially greater than the combined thickness of the flanges on said tubular elements, said gasket and said ring to provide for relative displacement between said collars axially of said tubular members when assembled thereover, and interfitting shoulders on the end of said collars engageable by such axial relative displacement to prevent separation of said collars when in alignment.

ALFRED C. ARBOGAST.

REFERENCES CITED

The following references are of record in the file of this patent:

UNITED STATES PATENTS

| Number | Name | Date |
|---|---|---|
| 101,927 | Shaller | Apr. 12, 1870 |
| 1,185,049 | Best | May 30, 1916 |
| 1,592,175 | Boyd | July 13, 1926 |
| 1,796,159 | Pallady | Mar. 10, 1931 |
| 1,937,881 | Fisher | Dec. 5, 1933 |
| 1,962,400 | McWane | June 12, 1934 |

FOREIGN PATENTS

| Number | Country | Date |
|---|---|---|
| 727,075 | France | June 13, 1932 |